(12) United States Patent
Mayer et al.

(10) Patent No.: US 11,027,497 B2
(45) Date of Patent: *Jun. 8, 2021

(54) ANCHORING IN A LIGHTWEIGHT BUILDING ELEMENT

(71) Applicant: MultiMaterial-Welding AG, Stansstad (CH)

(72) Inventors: Jörg Mayer, Niederlenz (CH); Joakim Kvist, Nidau (CH); Mario Lehmann, Les Pommerats (CH); Patricia Poschner, Uettligen (CH)

(73) Assignee: MULTIMATERIAL-WELDING AG, Stansstad (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/740,887

(22) Filed: Jan. 13, 2020

(65) Prior Publication Data

US 2020/0147898 A1 May 14, 2020

Related U.S. Application Data

(62) Division of application No. 15/563,674, filed as application No. PCT/EP2016/063211 on Jun. 9, 2016, now Pat. No. 10,562,237.

(30) Foreign Application Priority Data

Jun. 11, 2015 (CH) .......................... 837/15

(51) Int. Cl.
*B32B 37/00* (2006.01)
*B29C 65/60* (2006.01)
(Continued)

(52) U.S. Cl.
CPC ............ *B29C 65/603* (2013.01); *B29C 65/08* (2013.01); *B29C 65/606* (2013.01);
(Continued)

(58) Field of Classification Search
USPC ........................................................ 156/73.1
See application file for complete search history.

(56) References Cited

U.S. PATENT DOCUMENTS

| 3,440,117 A | 4/1969 | Soloff et al. |
| 3,754,310 A | 8/1973 | Shea |

(Continued)

FOREIGN PATENT DOCUMENTS

| CN | 109072958 | 12/2018 |
| DE | 4317621 | 6/1994 |

(Continued)

OTHER PUBLICATIONS

English translation of Chinese Office Action dated Feb. 28, 2020, Application No. 201680030657.X, 7 pages.

(Continued)

*Primary Examiner* — James D Sells
(74) *Attorney, Agent, or Firm* — Rankin, Hill & Clark LLP

(57) ABSTRACT

A method of anchoring a connector in a heterogeneous first object that includes a first building layer and, distally of the first building layer, an interlining layer. The method includes providing the first object and the connector, which includes thermoplastic material in a solid state; contacting the connector with the first building layer; applying a first mechanical pressing force to the connector until the first building layer is pierced by the connector and a distal portion of the connector reaches into the interlining layer; applying a second mechanical pressing force and mechanical vibration to the connector until a flow portion of the thermoplastic material is flowable and penetrates structures of the first object, and a distally facing abutment face of the head portion abuts against the metal profile in a region next to the (Continued)

opening; and letting the thermoplastic material resolidify to yield a positive-fit connection.

26 Claims, 4 Drawing Sheets

(51) Int. Cl.
  *B29C 65/08* (2006.01)
  *B29C 65/64* (2006.01)
  *B29C 65/74* (2006.01)
  *B29C 65/00* (2006.01)
  *F16B 5/01* (2006.01)
  *F16B 5/08* (2006.01)
  *E04B 1/41* (2006.01)
  *B29L 31/10* (2006.01)
  *F16B 5/04* (2006.01)

(52) U.S. Cl.
  CPC ......... *B29C 65/608* (2013.01); *B29C 65/645* (2013.01); *B29C 65/7437* (2013.01); *B29C 66/1122* (2013.01); *B29C 66/21* (2013.01); *B29C 66/30325* (2013.01); *B29C 66/30326* (2013.01); *B29C 66/472* (2013.01); *B29C 66/474* (2013.01); *B29C 66/524* (2013.01); *B29C 66/723* (2013.01); *B29C 66/727* (2013.01); *B29C 66/72525* (2013.01); *B29C 66/7392* (2013.01); *B29C 66/742* (2013.01); *B29C 66/8242* (2013.01); *B29C 66/8322* (2013.01); *B29C 66/9221* (2013.01); *B29C 66/9231* (2013.01); *B29C 66/9241* (2013.01); *B29C 66/9292* (2013.01); *B29C 66/92445* (2013.01); *B29C 66/92921* (2013.01); *B29C 66/951* (2013.01); *E04B 1/40* (2013.01); *F16B 5/01* (2013.01); *F16B 5/08* (2013.01); *B29C 2793/0045* (2013.01); *B29L 2031/10* (2013.01); *F16B 5/04* (2013.01)

(56) References Cited

U.S. PATENT DOCUMENTS

| | | | |
|---|---|---|---|
| 10,562,237 | B2 * | 2/2020 | Mayer ................... B29C 65/645 |
| 2005/0126680 | A1 | 6/2005 | Aeschlimann et al. |
| 2017/0015049 | A1 | 1/2017 | Kittel |
| 2017/0043525 | A1 | 2/2017 | Wiethoff et al. |

FOREIGN PATENT DOCUMENTS

| | | |
|---|---|---|
| EP | 0 537 824 | 4/1993 |
| EP | 1 614 525 | 1/2006 |
| EP | 2 202 050 | 6/2010 |
| JP | 2013-107394 | 6/2013 |
| WO | 93/12344 | 6/1993 |
| WO | 98/42988 | 10/1998 |
| WO | 00/79137 | 12/2000 |
| WO | 2008/080238 | 7/2008 |
| WO | 2015/135824 | 9/2015 |
| WO | 2015/162029 | 10/2015 |

OTHER PUBLICATIONS

International Preliminary Report on Patentability dated Dec. 12, 2017 (Dec. 12, 2017), Application No. PCT/EP2016/063211, 6 pages.

* cited by examiner

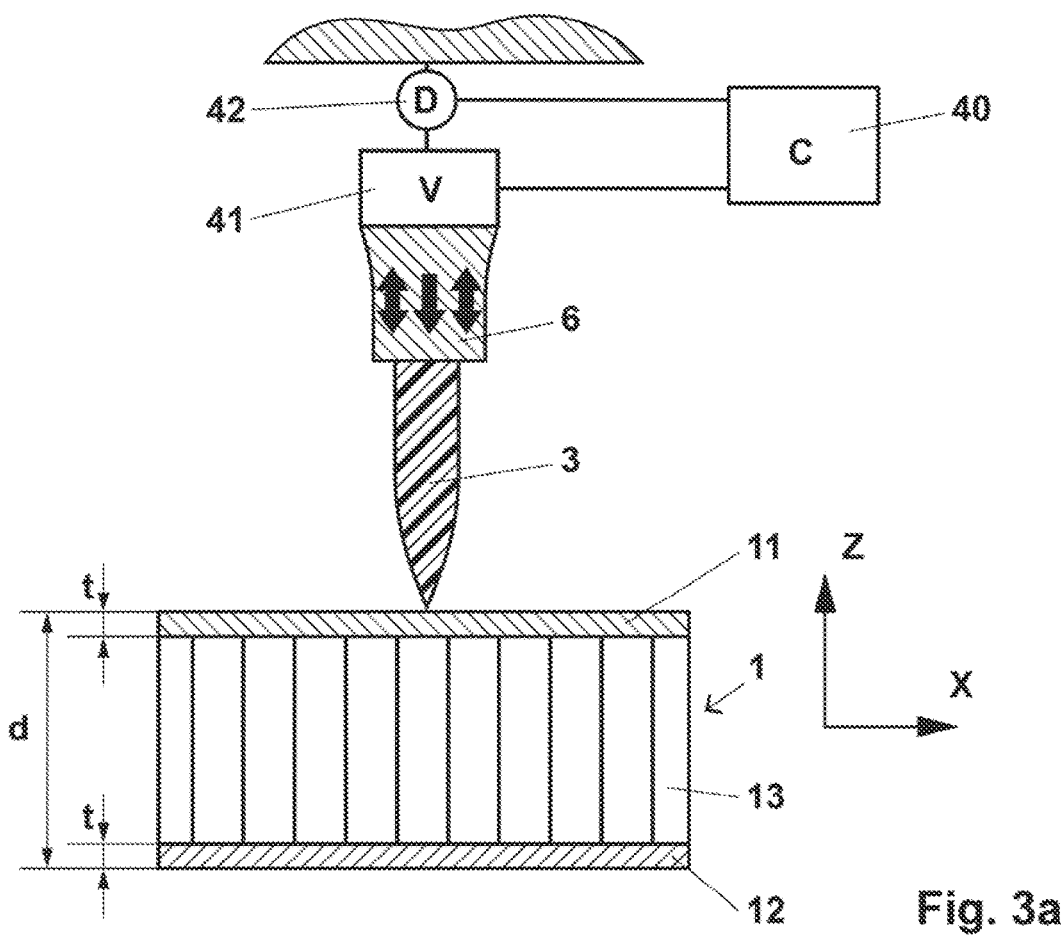
Fig. 3a
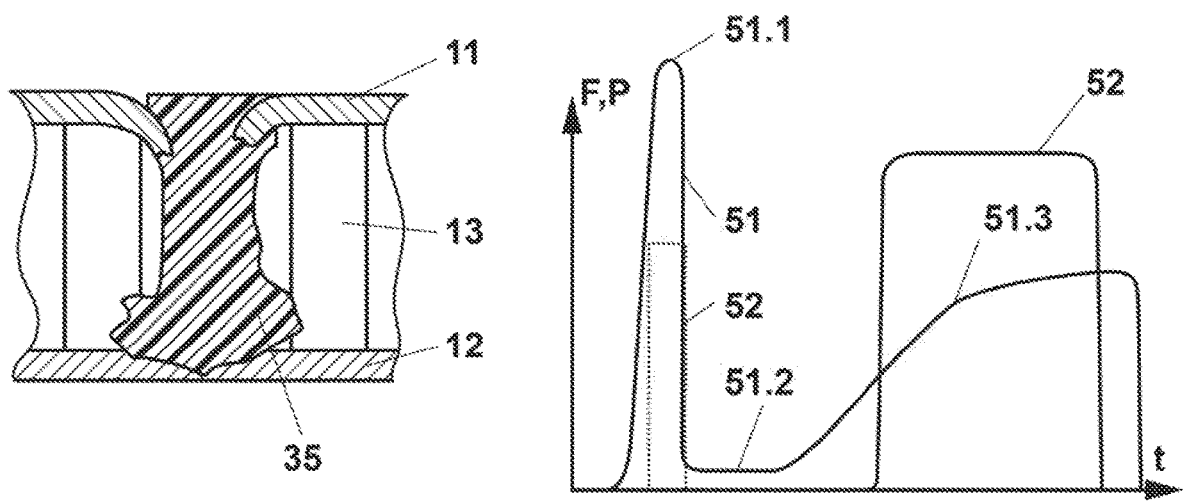
Fig. 3b
Fig. 4

ANCHORING IN A LIGHTWEIGHT BUILDING ELEMENT

BACKGROUND OF THE INVENTION

Field of the Invention

The invention is in the fields of mechanical engineering and construction, especially mechanical construction, for example automotive engineering, aircraft construction, shipbuilding, machine construction, toy construction etc. In particular, it relates to a method of anchoring a connector in a first object and of mechanically securing a second object to a first object.

Description of Related Art

In the automotive, aviation, furniture and other industries, there has been a tendency to move away from steel constructions and to use lightweight building components. An example of such elements are lightweight building elements that include two outer, comparably thin building layers, for example of a fiber composite, such as a glass fiber composite or carbon fiber composite, a sheet metal or also, depending on the industry, of a fiberboard, and a middle layer (interlining) arranged between the building layers, for example a cardboard honeycomb structure or a lightweight metallic foam. Lightweight building elements of this kind may be referred to as "sandwich boards" and are sometimes called "hollow core boards (HCB)". They are mechanically stable, may look pleasant and have a comparably low weight.

However, because the building layers are thin and the interlining is not suitable for anchoring a connector—such as a dowel—in it, it is difficult to attach an object to the lightweight building elements other than by an adhesive bond to the surface.

To meet these challenges, the automotive, aviation and other industries have started heavily using adhesive bonds. Adhesive bonds can be light and strong but suffer from the disadvantage that there is no possibility to long-term control the reliability, since a degrading adhesive bond, for example due to an embrittling adhesive, is almost impossible to detect without entirely releasing the bond. Also, adhesive bonds may lead to a rise in manufacturing cost, both, because of material cost and because of delays caused in manufacturing processes due to slow hardening processes, especially if the surfaces to be connected to each other have certain roughness and as a consequence the quickly hardening thin-layer adhesives cannot be used.

SUMMARY OF THE INVENTION

It is an object of the present invention to provide a method of anchoring a connector in a first object, especially in a sandwich board that has a comparably weak an interlining layer sandwiched between a first and a second building layer, wherein the interlining layer may not have sufficient stability to serve as sole anchoring material for the connector. It is a further object to provide a method of securing a second object to a first object. The methods should overcome disadvantages of prior art methods.

A method of anchoring a connector in a heterogeneous first object including a first building layer and, distally of the first building layer, an interlining layer, wherein the interlining layer has a density substantially lower than a density of the first building layer and/or a mechanical resistance against insertion of the connector substantially lower than the corresponding mechanical resistance of the first building layer, the method including the steps of:
  providing the first object;
  providing the connector that includes thermoplastic material in a solid state and extends between a proximal end and a distal end;
  bringing the connector into physical contact with the first building layer;
  applying a first mechanical pressing force to the connector until the first building layer is pierced by the connector and a distal portion of the connector reaches into the interlining layer;
  applying a second mechanical pressing force and mechanical vibration to the connector until a flow portion of the thermoplastic material is flowable and penetrates structures of the first object, and a distally facing abutment face of the head portion abuts against the metal profile in a region next to the opening; and
  letting the thermoplastic material resolidify to yield a positive-fit connection between the connector and the sandwich board.

In this, the mechanical resistance may, for example, be the force needed to advance the connector by a certain distance (for example 1 mm) into material of the respective material if no additional energy impinges.

The first mechanical pressing force and the second mechanical pressing force may be identical in magnitude or especially may be different from each other in magnitude. Especially, the first pressing force may be larger than the second pressing force.

The second pressing force and/or possibly also the first pressing force may be subject to a pressing force profile, i.e. may vary depending on time and position of the connector relative to the first object. The pressing force may be controlled depending on the position, on the encountered resistance, and/or on the time.

The second pressing force and in many embodiments also the first pressing force may be applied by a sonotrode that presses against the connector and that during the step of applying mechanical vibration (i.e. while the second pressing force is applied) is subject to the mechanical vibration that is coupled via a distally facing coupling-out face of the sonotrode into the connector. In many embodiments the sonotrode in this will be in physical contact with the connector, however, it is also possible that an intermediate element is present between the sonotrode and the connector.

In many embodiments, no mechanical vibration will be coupled into the connector while the first mechanical pressing force is applied to pierce the first building layer. This may especially be advantageous in some embodiments in which a distal end of the connector—that pierces the first building layer—includes thermoplastic material. If no vibrations act during piercing, no softening of the distal end may occur. However, optionally the piercing of the first building layer may be vibration assisted, i.e. in embodiments, mechanical vibrations act also during the step of applying the first pressing force. Such mechanical vibrations may optionally be different from the vibrations that act during the subsequent step of applying the second mechanical pressing force in amplitude and/or frequency.

In the step of applying the first pressing force and thereafter, in many embodiments the first building layer will only be pierced and remains a coherent, contiguous layer. Portions of the first building layer around the piercing location may for example be deformed, such as bent towards distally.

Upon further insertion of the connector, the first building layer around the piercing location may become integrated in the anchoring set-up, for example by the flow portion flowing around it and embedding portions of the first building layer around the anchoring location, and/or by guiding the connector and for example even exerting a resilient lateral force on it that causes some clamping. Thereby, these for portions may contribute to the stability of the anchoring.

For the step of applying the second mechanical pressing force, the vibrations may be caused to set in from the beginning (i.e. as soon as the first building layer has been pierced) or only after the distal end of the connector has advanced into material of the interlining layer by a certain minimal distance.

During the step of applying the second mechanical pressing force, at least a proximally facing coupling face of the connector, via which the second pressing force and the vibrations may be coupled into the connector, will be advanced further into a distal direction, i.e. at least a portion of the connector will advance further into the first object.

The first object may especially be a sandwich board, further including a second building layer distally of the interlining layer, the second building layer having a density and/or mechanical stability (especially resistance against insertion of the connector) substantially higher than the density/stability of the interlining layer.

For example, the second building layer may be of a same composition as the first building layer. A thickness of the second building layer may optionally be a same thickness as a thickness of the first building layer.

Generally, the first object may be a sandwich board in which the interlining layer has a structure with gas-filled spaces, for example in a regular arrangement. The gas-filled spaces may in embodiments extend vertically between the first building layer and the second building layer. In addition or as an alternative, the gas-filled spaces may take up a substantial part of the interlayer volume, for example at least 50% or at least 65%. An average density of the interlining layer is for example smaller than a density of the first and/or second building layer by at least a factor 5, in embodiments at least by a factor 10 or even a factor 15.

Such sandwich boards with optimized thickness ratios (with building layer thicknesses of for example 1-2% of the overall board thickness each) may be shown to have a bending stiffness similar to a monolithic board of the building layer material of a more than five times higher weight. Thus, sandwich boards with sufficiently low interlining layer thickness may bring about substantial reductions in overall weight given a certain mechanical stiffness requirement.

However, if in sandwich boards of this kind a connector (or other device) is driven into the object the mechanical resistance substantially drops as soon as the first building layer has been penetrated and the connector is to be driven into the interlining layer. In addition, this resistance drop is not fully predictable and depends on whether the distal end of the connector advances in a hollow space or not. Therefore, after having been driven through the first building layer, the connector may be expected to crash through the interlining layer and also through the second building layer. However, this will result in insufficient anchoring of the connector, and often the second building layer should remain intact.

It is an insight underlying the present invention that it may be beneficial to nevertheless drive the connector through the first building layer and at the same time to control the pressing force in a manner that it advances through the interlining layer in a controlled manner and/or stops before the second building layer may be disrupted.

Especially, in embodiments, the second mechanical pressing force is applied until a distal end of the connector is sufficiently in contact with the second building layer for the mechanical resistance to increase again, i.e. the pressing force is applied until the connector reaches the second building layer but without the second building layer being penetrated.

For example, the pressing force during the process may be controlled so that it reaches a first level during the step of piercing the first building layer, then drops immediately to follow a second profile during movement through the interlayer, and reaches a third level when a the advancing movement is impeded by the second building layer. In this, the first level and the third level are above an average pressure value during the second profile, for example above any pressure value reached when the second profile is followed. In other words, the pressing force is high until the first building layer is pierced, then strongly reduced for the connector to advance into and through the interlining layer, and then again rises when the connector is in contact with the second building layer (or an adhesive layer attributed to the second building layer).

In a special group of embodiments, the connector includes a portion of a non-liquefiable material in addition to a thermoplastic portion, which non-liquefiable portion forms a distal piercing structure initially, but which portion is displaced relative to the thermoplastic material towards a proximal direction by the effect of the (second) pressing force as soon as the thermoplastic material becomes sufficiently soft due to the impact of the vibration energy.

In this text, generally the term 'connector' refers to a connector in a broad sense of the word, including a mechanical connector for mechanically connecting another object or a connecting portion, i.e. the connector may be one-piece with the object to be connected or constituting the object to be connected. Also, the connector may directly carry or have integrated such second object (for example if the second object is smaller than the connector itself, for example if the second object is a sensor, a cable, etc.

In a group of embodiments, the method includes the further step of securing a second object to the first object by means of the connector. For example:

- The connector may include a head portion, and the second object is clamped between a proximally facing surface portion of the first object and the head portion.
- The connector may include an attachment structure, such as a thread, a structure for a bayonet connection, a clip-on structure, an attachments surface for gluing a second object thereto, etc.
- The second object may be assembled to the first object after anchoring of the connector from the distal side, for example through the essentially intact distally facing surface, for example by being driven into material of the assembly of the first object and the connector.

In general, the connector may be attached to a second object, prior to the step of causing mechanical vibration energy to impinge on the first object, during/by this step, and/or thereafter.

In embodiments, a second object includes a profile, such as a metal profile. If applicable, the metal profile may hold the foot.

The method may include carrying out the steps of bringing the connector into contact with the first object and of causing mechanical vibration energy to impinge on the connector while the object and the connector are pressed against each other for a plurality of connectors that are all anchored in the same first object simultaneously, for example using a single sonotrode. In this, the plurality of connectors may be held by a common second object at least during the step of causing mechanical vibration energy to impinge on the first object while the object and the connector are pressed against each other.

According to a further, second aspect of the present invention, a method of fastening a metal profile, for example a metal frame, to a sandwich board includes using a connector including a thermoplastic material in a solid state and including a head portion and a shaft portion, the method including providing the sandwich board and the connector,
providing the metal profile with an opening,
bringing the connector into contact with the sandwich board while the metal profile is proximally of the sandwich board, with the shaft portion of the connector reaching through the opening;
applying a mechanical pressing force and mechanical vibration to the connector until: the shaft portion of the connector goes through the proximal building layer and the interlining, a distal end of the connector is pressed against an inner surface of the distal building layer, a flow portion of the thermoplastic material is flowable and penetrates structures of the sandwich board, and a distally facing abutment face of the head portion abuts against the metal profile in a region next to the opening, and
letting the thermoplastic material resolidify to yield a positive-fit connection between the connector and the sandwich board.

The method according to the second aspect may especially be carried out according to the first aspect, i.e. with the step of piercing the first (proximal) building layer by the connector. Any one of the above-described optional features and embodiments of the first aspect also apply as options for the second aspect.

The following applies generally, for both aspects:

The structures of the first object penetrated by the flow portion may be structures, especially pores, of a penetrable material.

A penetrable material suitable for this is solid at least under the conditions of the method according to the invention. It further includes (actual or potential) spaces into which the liquefied material can flow or be pressed for the anchoring. It is e.g. fibrous or porous or includes penetrable surface structures, which are e.g. manufactured by suitable machining or by coating (actual spaces for penetration). Alternatively the penetrable material is capable of developing such spaces under the hydrostatic pressure of the liquefied thermoplastic material, which means that it may not be penetrable or only to a very small degree when under ambient conditions. This property (having potential spaces for penetration) implies, e.g., inhomogeneity in terms of mechanical resistance. An example of a material that has this property is a porous material whose pores are filled with a material that can be forced out of the pores, a composite of a soft material and a hard material or a heterogeneous material in which the interfacial adhesion between the constituents is smaller than the force exerted by the penetrating liquefied material. Thus, in general, the penetrable material includes an inhomogeneity in terms of structure ("empty" spaces such as pores, cavities etc.) or in terms of material composition (displaceable material or separable materials).

In the example of a sandwich board with glass fiber composite building layers and an interlining between them, the penetrable material may for example include a foaming adhesive, such as a PU adhesive, between the building layers and the interlining, and/or by the interlining that itself may include spaces/pores. In addition or as an alternative, the building layers or one of the building layers may be penetrable in the above sense.

The first object may have a generally flattish section (and may for example generally be flattish/board shaped) with two opposed broad surfaces and narrow side faces, the distal and proximal sides corresponding to the broad surfaces.

The first object, as mentioned, may be a sandwich board, i.e. a building element that includes two outer, comparably thin building layers, for example of a fiber composite, such as a glass fiber composite or carbon fiber composite, of a sheet metal or also, of a fiberboard, and an interlining arranged between the building layers.

The building layers may in addition to the mechanically stable composite or metal sheet also include at least one further material, such as a layer of a plastic material (an example is a mat of PET fibers), barrier films (a PP barrier film in an example), etc.; and in addition or as an alternative optionally an adhesive layer may be present between the building layers and the interlining layer.

Suitable materials for forming an interlayer, for example in a honeycomb structure, include PP (Polypropylene), PE (Polyethylene), PS (Polystyrene), PET (Polyethylene terephthalate), PA (Polyamide), PC (Polycarbonate), ABS (Acrylonitrile-butadiene-styrene), PPS (Polyphenylene sulfide), PEI (Polyetherimide) as well as other polymer-based materials and cardboard. Also a lightweight metallic foam or a polymer foam or ceramic foam, etc., or a structure of discrete distance holders is possible.

The connector includes thermoplastic material. In embodiments, the connector consists of thermoplastic material.

In other embodiments, the connector in addition to the thermoplastic material includes a body of a not liquefiable material.

Generally, the connector may be essentially pin shaped or bolt shaped (i.e. have a shaft portion), with the mentioned optional head or foot portion and/or a possible additional step or taper. Then, an axis of the connector is caused to extend approximately perpendicularly to the sheet portion and attachment face. However, the connector does not necessarily have a round cross section. Rather, it may have a different shape, for example elongate, polygonal, T-shaped. H-shaped, U-shaped, etc.

The energy applied is mechanical vibration energy. The liquefaction of the flow portion in this is primarily caused by friction between the vibrating connector and the surface of the first object, which friction heats the connector superficially.

In a group of embodiments, the connector and/or a portion of the first object against which the connector is pressed comprises, at the surface that during the pressing and vibrating is in direct contact with the first object, structures serving as energy directors, such as edges or tips, such as energy directors known from ultrasonic welding or for the "Woodwelding" process as for example described in WO 98/42988 or WO 00/79137 or WO 2008/080 238.

The first and (if applicable) second objects are construction components (construction elements) in a broad sense of the word, i.e. elements that are used in any field of mechanical engineering and construction, for example automotive engineering, aircraft construction, shipbuilding, building construction, machine construction, toy construction etc. Generally, the first object and the connector and (if applicable) the second object will all be artificial, man-made objects. The use of natural material such as wood-based material in the first and/or second object is thereby not excluded. Especially, the second object may be a 'stringer' or other reinforcement mechanically reinforcing the first object (or vice versa).

The flow portion of the thermoplastic material is the portion of the thermoplastic material that during the process and due to the effect of the mechanical vibrations is caused to be liquefied and to flow. The flow portion does not have to be one-piece but may include parts separate from each other, for example at the proximal end of the connector and at a more distal place.

In this text the expression "thermoplastic material being capable of being made flowable e.g. by mechanical vibration" or in short "liquefiable thermoplastic material" or "liquefiable material" or "thermoplastic" is used for describing a material including at least one thermoplastic component, which material becomes liquid (flowable) when heated, in particular when heated through friction, i.e., when arranged at one of a pair of surfaces (contact faces) that are in contact with each other and vibrationally moved relative to each other, wherein the frequency of the vibration has the properties discussed hereinbefore. In some situations, for example if the first object itself has to carry substantial loads, it may be advantageous if the material has an elasticity coefficient of more than 0.5 GPa. In other embodiments, the elasticity coefficient may be below this value, as the vibration conducting properties of the first object thermoplastic material do not play a role in the process.

Thermoplastic materials are well-known in the automotive and aviation industry. For the purpose of the method according to the present invention, especially thermoplastic materials known for applications in these industries may be used.

A thermoplastic material suitable for the method according to the invention is solid at room temperature (or at a temperature at which the method is carried out). It preferably includes a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally include a polymeric component that is not cross-linked covalently or cross-linked in a manner that the cross-linking bonds open reversibly upon heating to or above a melting temperature range. The polymer material may further include a filler, e.g. fibres or particles of material which has no thermoplastic properties or has thermoplastic properties including a melting temperature range that is considerably higher than the melting temperature range of the basic polymer.

In this text, generally a "non-liquefiable" material is a material that does not liquefy at temperatures reached during the process, thus especially at temperatures at which the thermoplastic material of the connector is liquefied. This does not exclude the possibility that the non-liquefiable material would be capable of liquefying at temperatures that are not reached during the process, generally far (for example by at least 80° C.) above a liquefaction temperature of the thermoplastic material or thermoplastic materials liquefied during the process. The liquefaction temperature is the melting temperature for crystalline polymers. For amorphous thermoplastics the liquefaction temperature (also called "melting temperature in this text") is a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa*s (in embodiments, especially with polymers substantially without fiber reinforcement, to below $10^3$ Pa*s)), of the thermoplastic material.

Specific embodiments of thermoplastic materials are: Polyetherketone (PEEK), polyesters, such as polybutylene terephthalate (PBT) or Polyethylenterephthalat (PET), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride, polyethylene, polypropylene, and polystyrene, or copolymers or mixtures of these.

In addition to the thermoplastic polymer, the thermoplastic material may also include a suitable filler, for example reinforcing fibers, such as glass and/or carbon fibers. The fibers may be short fibers. Long fibers or continuous fibers may be used especially for portions of the first and/or of the second object that are not liquefied during the process.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

Mechanical vibration or oscillation suitable for embodiments of the method according to the invention has preferably a frequency between 2 and 200 kHz (even more preferably between 10 and 100 kHz, or between 20 and 40 kHz) and a vibration energy of 0.2 to 20 W per square millimeter of active surface. The vibrating tool (e.g. sonotrode) is e.g. designed such that its contact face oscillates predominantly in the direction of the tool axis (longitudinal vibration) and with an amplitude of between 1 and 100 µm, preferably around 30 to 60 µm. Such preferred vibrations are e.g. produced by ultrasonic devices as e.g. known from ultrasonic welding.

In this text, the terms "proximal" and "distal" are used to refer to directions and locations, namely "proximal" is the side of the bond from which an operator or machine applies the mechanical vibrations, whereas distal is the opposite side. A broadening of the connector on the proximal side in this text is called "head portion", whereas a broadening at the distal side is the "foot portion".

BRIEF DESCRIPTION OF THE DRAWINGS

In the following, ways to carry out the invention and embodiments are described referring to drawings. The drawings are schematical in nature. In the drawings, same reference numerals refer to same or analogous elements. The drawings show:

FIGS. 3a and 3b different stages of a process of anchoring a connector in a sandwich board;

FIG. 4 a process diagram;

FIG. 7 a variant of the connector of FIG. 6a;

DETAILED DESCRIPTION OF THE INVENTION

Figure 1:
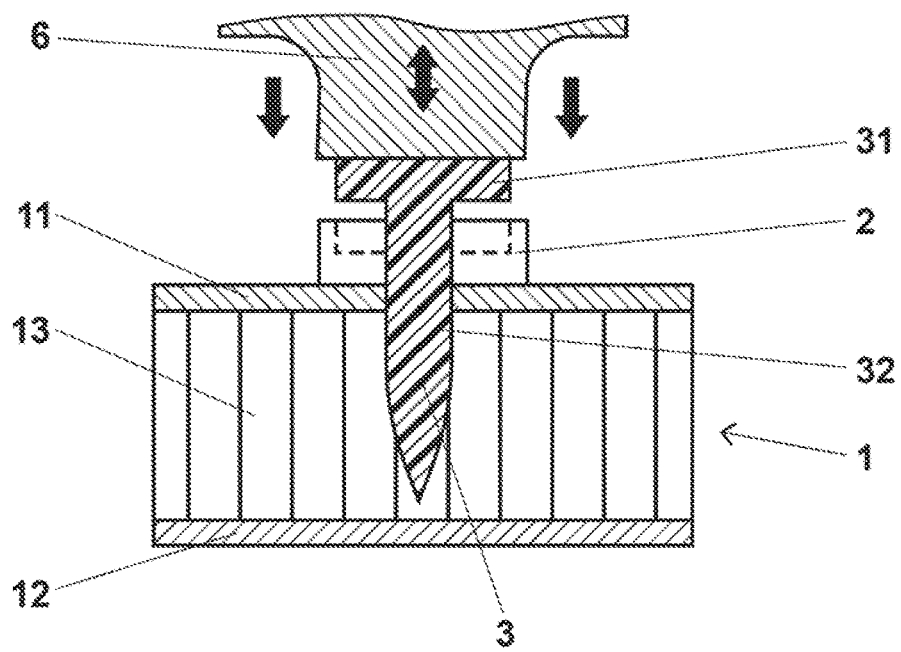
FIG. 1 a setup of for carrying out the method according to the first and/or the second aspect of the invention.

A set-up for carrying out the method described herein is shown in FIG. 1. The first object 1 is a sandwich board having a first building layer 11, a second building layer 12, and an interlining layer 13, for example with a honeycomb structure.

The connector 3 has a head portion 31 and a shaft portion 32 ending in a distal tip. The connector may be introduced into the sandwich board by the distal tip piercing the first building layer 11 as described in more detail hereinafter, or a whole may be drilled into the sandwich board prior to the introduction of the connector, the hole extending at least through the first building layer and at most in addition also through the interlining layer.

For the fastening process, the sonotrode 6 acts on the head portion 31 of the connector 3 and presses it against the inner surface of the second building layer that is held against a non-vibrating support (not shown in FIG. 1). The head portion 31 and the first building layer 11 at the end of the process clamp the second object 2 to secure it to the first object.

Figure 2:
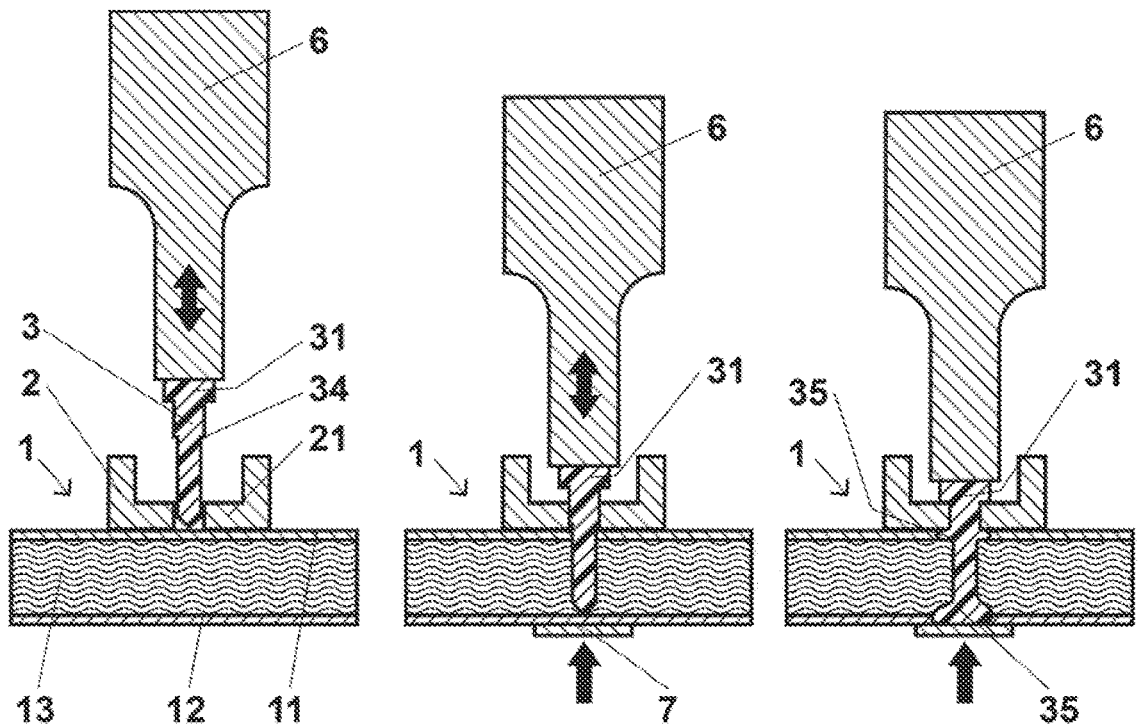
FIG. 2 a further configuration of a first object, a second object and a connector during three different stages of a process of securing a second object to the first object by the connector, wherein the second object is a metal frame.

This is also illustrated in FIG. 2. FIG. 2 also illustrates an additional step feature 34 that in addition to the flow portion parts at the distal end (that anchors the connector 3 in the second building layer 12, including possible adhesive etc. and also in the interlining and also may form a sort of a foot portion) causes a proximal flow portion 35 part around the opening in the first building layer 11.

The second object is illustrated to include a metal profile that forms a sheet portion 21 around the opening in the first building layer 11. The sheet portion 21 at the end of the process is clamped between the head portion 31 of the anchored connector and the first building layer.

For penetrating into the first object, the connector 3, the second object 2 and the first object are arranged relative to one another so that the distal end of the connector 3 reaches through a through opening of the second object and is in physical contact with the first building layer 11 (left panel). Then, the connector is pushed through the first building layer 11 by applying the first pressing force. This may be done vibration assisted (as schematically illustrated in the left panel of FIG. 2, or without any vibration. As soon as the distal tip of the connector has pierced the first building layer, the pressing force is strongly reduced and the connector 3 is moved through the interlining layer 13. Then, in contact with the second building layer 12, the above-described process, which results in liquefaction of a flow portion 35 of the thermoplastic material, sets in. A non-vibrating support 7 may be held locally (as schematically illustrated) or extensively against the distal surface of the second building layer 12.

FIG. 3a illustrates a set-up similar to the one of the left panel of FIG. 2 (with no second object shown, however, a second object secured to the first object may be present or mounted after the process, of course). While the distal side of the first object 1 abuts against a stationary support (not shown) the sonotrode 6 is pressed against the proximal incoupling surface of the connector 3 by a driving mechanism 42, and, depending on the process stage, a vibration generating device 41 (for example including a piezoelectric transducer) sets it into vibrational movement.

A control unit 40 controls the vibration generation and the pressing force/forward movement.

Generally, in the context of the present, a control unit is a unit in the functional sense and does not have to be a unit in the physical sense, i.e. different elements constituting the control unit may be physically separate from each other and for example belong to different parts/different entities, which different entities optionally may include further elements and serve further functions.

The apparatus may further include first sensing means for sensing directly or indirectly a position of the sonotrode 6 and/or the connector (a direct sensing means may for example include an optical position measuring stage; an indirect sensing means for example may use a control and/or feedback signal of the driving mechanism) and/or a second sensing means for sensing directly or indirectly a force exerted by the tool on the connector (a direct sensing means may be a force/pressure measuring device in series with the vibration generating device; an indirect sensing means may use a control and/or feedback signal of the driving mechanism and/or of the vibration generating device). The first sensing means and/or the second sensing means may be separate devices or optionally be integrated in the control unit, i.e. the sensing means may be sensing means in the functional sense of the word, and they do not have to be physically separate entities.

The apparatus may for example be equipped and programmed to control the exerted force and/or the vibration generation according to one of the following criteria:

According to an option, a pre-defined velocity profile for the forward movement of the sonotrode may be defined (such as constant velocity, or a velocity that decreases when the distal end of the connector is in contact with either of the building layers). The force needed may then be used as a feedback signal.

For example, a trigger force (on the tool) may defined. As soon as the force exceeds a trigger force, the vibrations set in.

In a variant, a condition for the vibrations to set in is that both, the trigger force is reached and the position of the connector is in a certain window. This second option is suitable for sandwich board first objects in set-ups in during the piercing of the first building layer the force exerted on the connector is generally above the trigger force—and if during this penetration it is not desired that mechanical vibration energy is absorbed by the system (for example because it would lead to undesired heat generation by the connector and/or by portions of the first building layer).

According to another option, the force and/or the vibrations may be controlled depending on the position, i.e. a force/vibration-as-a-function-of-position-profile is defined.

According to an even further option, if the properties of the first object are sufficiently precisely defined and well-known, the force and/or vibration may follow a time-dependent profile.

Other options or combinations (for example if the apparatus is programmed to apply different options for different kinds of connectors or based on settings chosen by the user) are possible also.

FIG. 3b depicts the situation after the end of the anchoring process, with the flow portion 35 penetrating structures of the interlining layer, and possibly also of the second building layer and/or an adhesive layer connecting these two.

FIG. 4 shows an example of a process diagram. The exerted force 51 is subject to a first peak 51.1 when the first building layer is penetrated. Then, during penetration of the interlining layer, the force is lower (51.2) and then again rises as the distal end of the connector approaches the second building layer (second peak 51.3). The vibration 52 will at least act in this stage when the connector is pressed against the second building layer. Optionally, it may also act during penetration of the first building layer (first peak, dashed line) or continuously starting with the penetration of the first building layer.

As shown in FIG. 4, it may be advantageous if the pressing force is maintained after the vibrations stop (holding force) until the flow portion has re-solidified at least to some extent.

In FIG. 4, the second force peak 51.3 is illustrated to be lower than the first peak 51.1. This does not need to be the case, however. Due to a local deformation at the distal end of the connector by the liquefaction of portions of the thermoplastic material (see for example FIG. 8 hereinafter) and/or due to the support by the support surface, the second building layer 12 may in some embodiments even withstand a higher pressing force than the force needed to pierce the first building layer, in embodiments even if it has the same composition and thickness.

Figure 5:
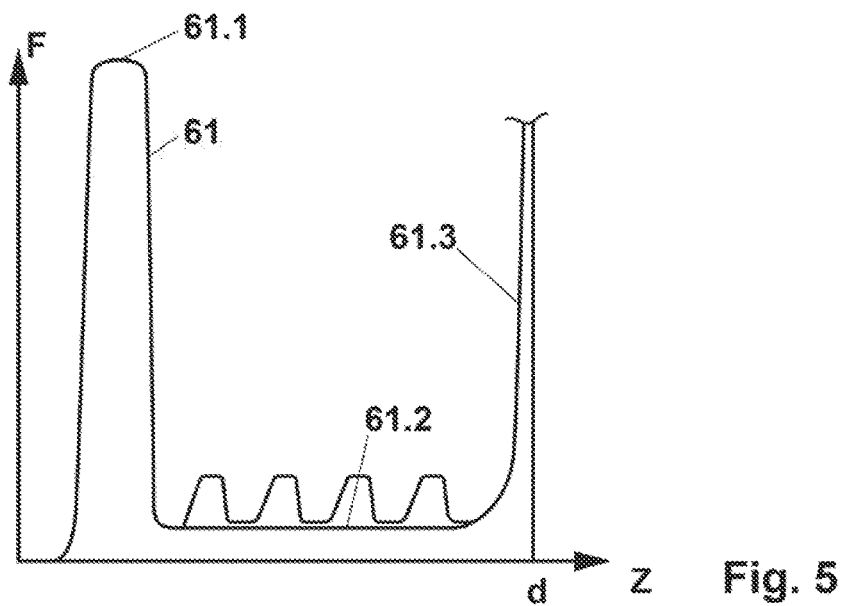
FIG. 5 a diagram of the mechanical resistance vs. the depth of the distal end portion.

FIG. 5 shows the force F (mechanical resistance against insertion of the connector; 61) not as a function of processing time but as a function of the 'vertical' position z. The extension of the first peak 61 corresponds approximately to the thickness t of the first building layer. In the intermediate region 61.2, in which the connector advances through the interlining layer, the force may be essentially constant or may follow some profile (dashed line) that depends on the structure of the interlining. When the distal end reaches the second building layer, the force rises again (61.3), for example relatively steeply as shown in FIG. 5. However, if during the transition of the intermediate region (phase 61.2), the connector is advanced only slowly and mechanical vibrations act, liquefaction or at least softening of distal portions of the thermoplastic material may set in already during this phase, and a more smooth transition to higher resistance forces may be observed.

This effect may be used to control the softening profile in a targeted manner. To this end, use can also be made of the fact that as soon as the material is above its glass transition temperature, internal friction caused by the vibration is much higher than below this temperature, and energy absorption does not require any more external friction (with an object, for example the first object, against which it is pressed) to the same degree. This is especially the case if one uses a system with controllable position (such as a servo controlled system and/or a system with synchronous motor or other motor with precisely controlled forward movement).

In embodiments, especially if (for example as illustrated in FIG. 4), the connector absorbs energy and becomes softened already during the piercing of the first building layer. Specifically, in some embodiments it can even be observed that the connector at the distal end becomes completely soft during the piercing step. Nevertheless, absorption (and consequently heat generation) may take place.

Figure 6A:
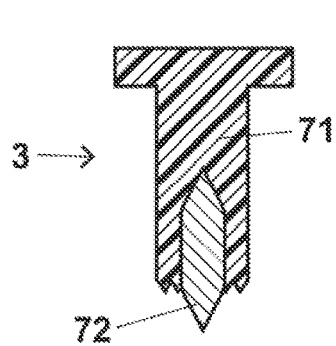
FIGS. 6a and 6b an alternative connector and the connector prior to being anchored and in an anchored state, respectively.

FIG. 6a illustrates a connector with a thermoplastic portion 71 and a non-liquefiable (for example metallic) portion 72. The non-liquefiable portion may be of a particularly hard material and have a distinct piercing tip at the distal end. During the phase of piercing the first building layer, the non-liquefiable portion due to this may serve as piercing aid.

Figure 6B:
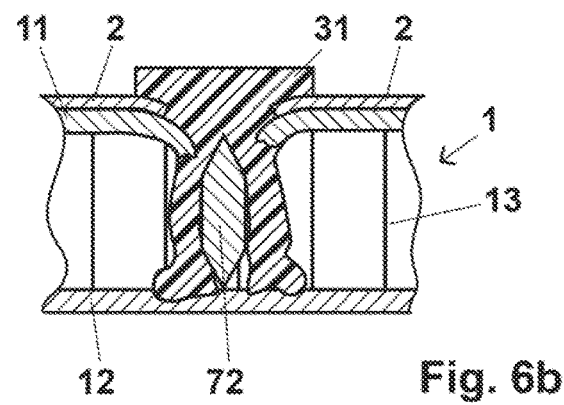

When in a later phase the absorbed vibration energy causes softening of the thermoplastic material and ultimately causes the thermoplastic material to become flowable, non-liquefiable portion 72 may be displaced relative to the thermoplastic portion so that even if the connector is pressed against the second building layer 12 it does not pierce the second building layer. To this end, in the illustrated embodiment the proximal end of the non-liquefiable portion is also pointed so as to offer less resistance against a displacement relative to the softened thermoplastic material into proximal directions. FIG. 6b shows the resulting configuration.

In embodiments like the one of FIG. 6a, during the phase of piercing, connector may be subject to no vibration energy input or to an input sufficiently low for the thermoplastic material not to substantially soften at the proximal end of the non-liquefiable portion. During the—slow—advancement through the interlining layer, however, the connector may be subject to vibration energy input so that the material may soften until the distal end of the connector races the second building layer.

Figure 7:
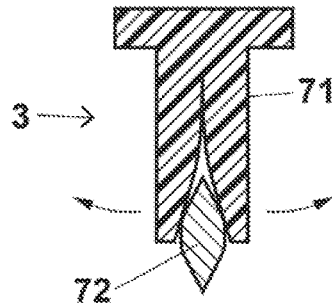

A variant of the configuration of FIG. 6a is shown in FIG. 7. In this variant, the thermoplastic portion 71 is slitted and formed so that the non-liquefiable portion 72 widens the slit when displaced towards distally (after the thermoplastic material has softened, causing an additional sideways expansion, as illustrated by the arrows in FIG. 7.

In both, the embodiment of FIG. 6a and the one of FIG. 7, the non-liquefiable portion 72 may form a distal tip or a distal blade (extending perpendicular to the drawing plane). Similarly, in the other embodiments described in the present text, the described tips may generally be replaced by according blades so that a piercing with a certain extension in one in-plane direction is created.

Figure 8A:
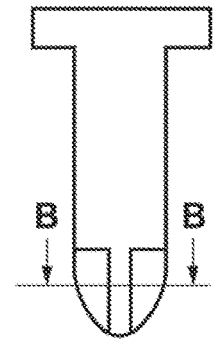
FIGS. 8a and 8b yet another connector.
Figure 8B:
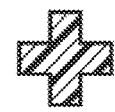

FIGS. 8a and 8b (FIG. 8b shows a section along the plane B-B in FIG. 8a), show an example of a connector with a tip region of reduced cross section, in the shown example with an approximately cross shaped cross section. Such region of reduced cross section area may both, assist the step of piercing the first building layer and ensure a swift onset of liquefaction at the distal end as soon as the vibration energy input starts so as not to risk that the second building layer is pierced also.

Figure 9A:
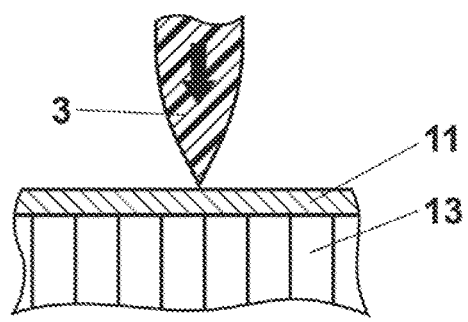
FIGS. 9a-9d the principle of assisting the anchoring by integrating portions of the first building layer around the piercing location.
Figure 9B:
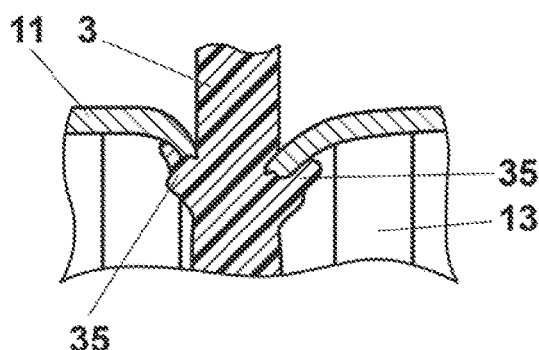

FIGS. 9a and 9b shows a distal end of a connector 3 with a piercing tip in contact with the first building layer 11 of a first object, and FIG. 9b illustrates the same detail of the first object after the anchoring process. The piercing by the connector 3 will cause the first building layer to become pierced, however, the first building layer 11 remains coherent, with portions around the piercing location being deformed to be bent towards distally (downwardly in the orientation of FIGS. 9a and 9b). These deformed portions provide some mechanical resistance against the insertion movement of the connector 3, and together with the mechanical vibration energy this will cause local heat generation. The process may due to this especially be carried out so that the flow portion 35 includes portions in contact with the first building layer. An at least partial embedding of at the deformed portions of the first building layer in the flow portion may result, yielding an anchoring effect around the piercing location, as also shown for example in FIG. 3b and in FIG. 6b.

This effect and the contribution of the first building layer to the anchoring may be used independently of whether there is an additional anchoring with respect to a second building layer 12, as shown in FIG. 2 (middle and right panel) or not.

Figure 9C:
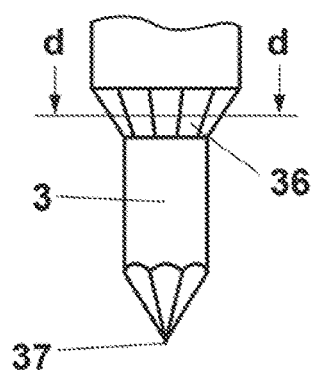
Figure 9D:
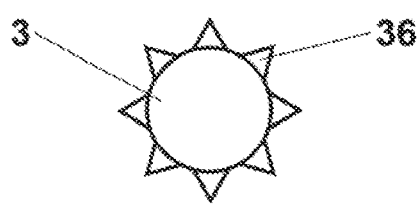

Similar to what is illustrated in FIG. 2, the connector may include targeted structure for achieving or intensifying this effect, such as the step feature 34, or a taper feature, or a collar of energy directors 36 located at an axial position where, towards the end of applying the second mechanical pressing force and the mechanical vibration to the connector, the first building layer will be, etc. FIGS. 9c and 9d illustrate an example of a connector 3 with a collar of energy directors 36 located at a tapered section. FIG. 9d shows a section along plane d-d in FIG. 9c.

What is claimed is:

1. A method of anchoring a connector in a heterogeneous first object comprising a first building layer and, distally of the first building layer, an interlining layer, wherein the interlining layer has a density substantially lower than a density of the first building layer and/or a mechanical stability substantially lower than a mechanical stability of the first building layer, the method comprising the steps of
   providing the first object;
   providing the connector that comprises thermoplastic material in a solid state and extends between a proximal end and a distal end;
   bringing the connector into physical contact with the first building layer;
   applying a first mechanical pressing force and mechanical vibration to the connector until the first building layer is pierced by the connector in a vibration assisted manner, and a distal portion of the connector reaches into the interlining layer;
   applying a second mechanical pressing force and mechanical vibration to the connector until a flow portion of the thermoplastic material is flowable and penetrates structures of the first object, and
   stopping the second mechanical vibration and letting the thermoplastic material resolidify to yield a positive-fit connection between the connector and the first object.

2. The method according to claim 1, wherein the mechanical vibration applied while the first mechanical pressing force is applied is different from the mechanical vibration applied while the second mechanical pressing force is applied, in amplitude or frequency or in amplitude and frequency.

3. The method according to claim 1, wherein in the step of applying the first pressing force and vibration and thereafter, the first building layer is only pierced and remains a coherent, contiguous layer.

4. The method according to claim 3, wherein as a result of application of the first pressing force and the vibration portions of the first building layer around a piercing location are deformed by being bent towards distally.

5. The method according to claim 1, wherein a vibration power P of the mechanical vibration applied to the connector is subject to a first peak while the first pressing force is applied.

6. The method according to claim 1, wherein the mechanical vibration applied to the connector acts continuously during application of the first and second pressing forces.

7. The method according to claim 1, wherein the second pressing force is maintained after the mechanical vibration is stopped until the flow portion has re-solidified at least to some extent.

8. The method according to claim 1, wherein the first mechanical pressing force is larger than the second mechanical pressing force.

9. The method according to claim 1, wherein the second pressing force is applied by a sonotrode that presses the connector against the first object.

10. The method according to claim 1,
    wherein the first object is a sandwich board comprising the first building layer, a second building layer, and the interlining layer sandwiched between the first and second building layers, with a density of the interlining layer being substantially lower than densities of the first and second building layers, and
    wherein applying the second mechanical pressing force comprises causing the connector to advance through the interlining layer until an advancing movement of the connector is impeded by the second building layer, without the second building layer being disrupted.

11. The method according to claim 10, wherein in the step of applying the second mechanical pressing force and the mechanical vibration to the connector, the flow portion of the thermoplastic material is made flowable at an interface between the connector and the second building layer.

12. The method according to claim 10, wherein the interlining layer comprises gas-filled spaces.

13. The method according to claim 12, wherein the gas-filled spaces take up at least 50% of a volume of the interlining layer.

14. The method according to claim 10, wherein the density of the interlining layer is smaller than the densities of the first building layer and of the second building layer by at least a factor 5.

15. The method according to claim 10, and comprising controlling the pressing force on the connector so that it reaches a first level during the step of piercing the first building layer, follows a second profile during movement through the interlining layer, and reaches a third level when a the advancing movement is impeded by the second building layer, wherein the first level and the third level are above an average pressure value during the second profile.

16. The method according to claim 1, wherein the connector comprises a portion of a non-liquefiable material in addition to a thermoplastic portion, which non-liquefiable portion forms a distal piercing structure initially, but which portion is displaced relative to the thermoplastic material towards a proximal direction by the effect of the (second) pressing force as soon as the thermoplastic material becomes sufficiently soft due to the impact of the vibration energy.

17. The method according to claim 1, wherein the connector comprises a proximal piercing or cutting shape.

18. The method according to claim 1, wherein the connector comprises a proximal head.

19. The method according to claim 1, comprising carrying out the step of bringing the connector into contact with the first object for a plurality of connectors simultaneously.

20. The method according to claim 1, comprising carrying out the step of causing mechanical vibration energy to impinge on the first object while the object and the connector are pressed against each other for a plurality of connectors simultaneously.

21. The method according to claim 20, wherein the connectors are held by a common second object.

22. The method according to claim 1, and further comprising providing a second object, and fastening the second object to the first object by the connector.

23. The method according to claim 22, wherein the second object comprise a sheet portion that after anchoring lies against a proximal attachment face of the first object.

24. The method according to claim 23, wherein the sheet portion is clamped between the attachment face and a distally facing abutment face of a head portion of the connector.

25. The method according to claim 22, wherein the second object comprises a metal profile.

26. The method according to claim 22,
wherein the connector comprises a proximal head portion with a distally facing abutment face,
wherein the second object comprises a through opening, the method comprising the step of positioning the first object, the second object and the connector relative to one another so that the second object rests against the first object and the connector extends through the opening, with a distal end of the connector being in the physical contact with the first building layer, and
wherein the step of applying the second mechanical pressing force and the mechanical vibration to the connector comprises applying the second mechanical pressing force until a distally facing abutment face of the head portion abuts against the metal profile in a region next to the opening.

* * * * *